United States Patent [19]

Gibilini et al.

[11] Patent Number: 4,661,742

[45] Date of Patent: Apr. 28, 1987

[54] LUMINESCENT SCREEN AND A METHOD OF FABRICATION OF SAID SCREEN

[75] Inventors: Daniel Gibilini, Grenoble; Jean Pierre Galves, Meylan, both of France

[73] Assignee: Thomson-CSF, Paris, France

[21] Appl. No.: 673,424

[22] Filed: Nov. 20, 1984

[30] Foreign Application Priority Data

Nov. 29, 1983 [FR] France ................................ 83 19019

[51] Int. Cl.[4] ......................... H01J 29/28; A23C 9/12

[52] U.S. Cl. ........................................ 313/474; 427/64

[58] Field of Search ............... 313/461, 465, 466, 473, 313/474; 427/38, 43.1, 64, 68; 358/252

[56] References Cited

U.S. PATENT DOCUMENTS 2,599,739 6/1952 Barnes ............................ 313/478 X
3,726,678 4/1973 Robinder .......................... 427/68 X
3,729,342 4/1973 Te Velde ............................. 427/64
4,135,113 1/1979 Tsuneta et al. ................. 313/474 X
4,251,610 2/1981 Haven et al. ...................... 427/68 X
4,310,784 1/1982 Anthon et al. ...................... 313/427
4,485,158 11/1984 Harper .............................. 427/68 X

FOREIGN PATENT DOCUMENTS 0018666 6/1980 European Pat. Off. .

*Primary Examiner*—Palmer C. DeMeo
*Assistant Examiner*—Sandra L. O'Shea
*Attorney, Agent, or Firm*—Roland Plottel

[57] ABSTRACT

The luminescent screen comprises blocks having an optical transparency of less than 1. The blocks are placed between the grains of the first layer of luminescent material and the transparent substrate and have a cross-sectional area which is equal at a maximum to that of the grains. Said blocks are formed by means of a selective plasma etching operation in which the grains of the first layer of luminescent material are employed as a mask.

18 Claims, 20 Drawing Figures

PRIOR ART
FIG_7
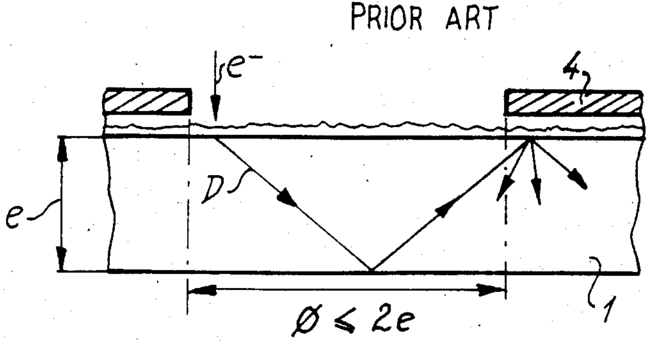
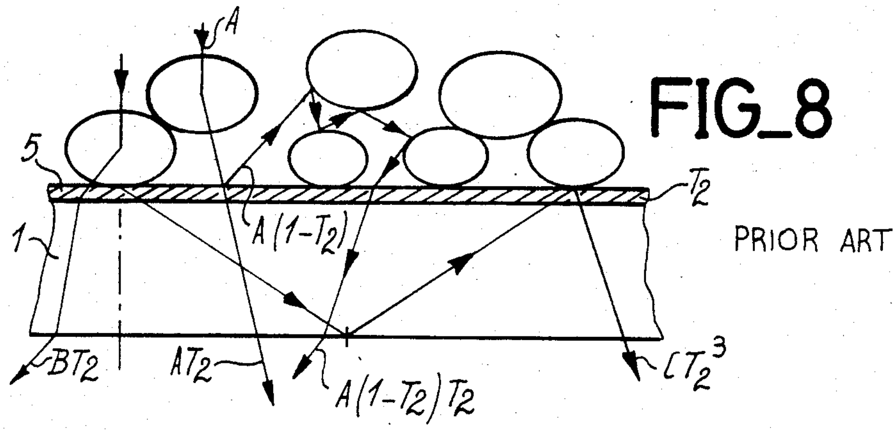
FIG_8
PRIOR ART
FIG_9
PRIOR ART
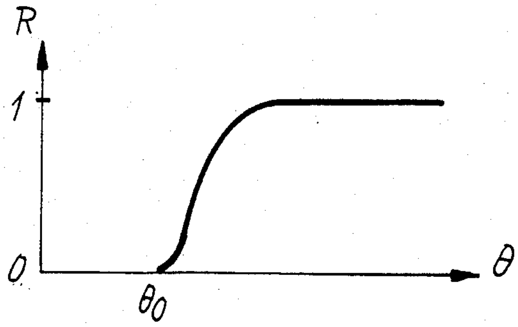
FIG_10 PRIOR ART
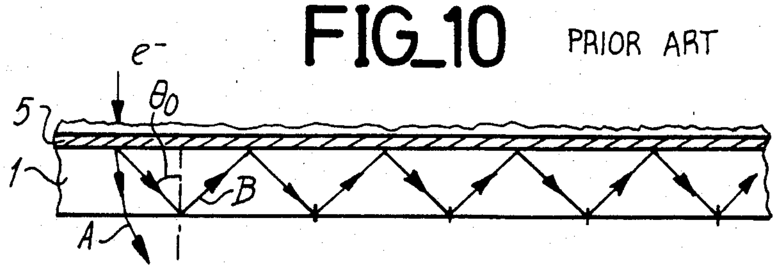

LUMINESCENT SCREEN AND A METHOD OF FABRICATION OF SAID SCREEN

BACKGROUND OF THE INVENTION

1. Field of the Invention

The present invention relates to luminescent screens and is also concerned with a method of fabrication of luminescent screens.

The screens under consideration in this invention are composed in particular of several layers of luminescent material in the form of grains which are deposited on a transparent support. As a general rule, this support consists of a glass substrate having parallel faces.

The luminescent material can be cathodoluminescent or, in other words, becomes luminescent when subjected to bombardment by an electron beam. Cathodoluminescent screens of this type are employed for example in cathode-ray tubes, x-ray image intensifiers and the like. By way of example, the luminescent material can also be electroluminescent or, in other words, becomes luminescent under the action of an electric field.

In the description which follows below, the problems to be solved and the solutions offered by the invention will be described in the case of cathodoluminescent screens employed in x-ray image intensifiers but it should clearly be understood that the invention applies to all the types of screens mentioned in the foregoing.

2. Description of the Prior Art (FIGS. 1 to 5)

An x-ray image intensifier is illustrated schematically in FIG. 1 of the accompanying drawings. This tube comprises a primary screen which has the function of converting the x-ray photons which it receives to light photons and then to photoelectrons. An electron-optical system (not shown in the figure) has the function of focusing the electron trajectories and producing an electron energy gain. Finally, a secondary cathodoluminescent screen effects the conversion of electrons to visible photons. It is this secondary screen which will be considered below.

FIGS. 2*a* and 2*b* of the accompanying drawings are transverse sectional views illustrating one form of construction of the secondary screen shown in FIG. 1.

On the glass substrate 1, there is formed a deposit 2 consisting of several layers of crystals of a cathodoluminescent substance, the first layer of which is in direct contact with the substrate. The last layer of crystals is covered with a metallic film 3 of aluminum, for example. This film serves to reflect to the observer the light produced within the screen and to apply an acceleration voltage to the incident electrons. FIG. 2*b* is an enlarged view of the screen zone which is surrounded by a circle in FIG. 2*a*.

By way of example, the cathodoluminescent substance employed can be silver-doped zinc sulfide. The diameter of the grains can vary for example between 1 and 3 microns according to the resolution which is sought.

The thickness of the glass substrate 1 is, for example, approximately 1 to 3 millimeters whereas the thickness of the luminescent material is approximately 10 microns.

It is known that the screens which have just been mentioned exhibit a halo phenomenon. When the screen is excited at a point which thus becomes luminous, light rings or halos are observed around this point on which they are centered. These halos are equidistant at a distance in the vicinity of double the thickness of the substrate and their intensity decreases as the observer moves away from the central luminous point.

This phenomenon is illustrated in FIGS. 3*a* and 3*b* of the accompanying drawings.

The screen shown in the profile view of FIG. 3*a* is subjected to an electron impact directed along the axis X—X′.

In FIG. 3*b*, there is shown the central luminous point resulting from this impact and three of the halos thus formed.

The explanation of this halo phenomenon will be recalled with reference to FIGS. 4 and 5 of the accompanying drawings.

In the sectional view of the luminescent screen shown in FIG. 4, the thickness of the metallic film 3 and of the layers of luminescent material 2 has been considerably increased in FIG. 4 with respect to the thickness of the substrate 1.

Any light ray generated in a grain A which is not in contact with the substrate passes through the substrate 1 as if it were a plate having parallel faces and produces an exit ray $A_1$. The same applies to the light rays generated in grains which are in contact with the substrate. However, these light rays emerge from the grains at a location other than the point of contact of the grain with the substrate. This is the case with the ray $B_o$ which emerges from the grain B.

Consideration will now be given to the case of light rays which are emitted by the grain B in contact with the substrate and pass in addition into the substrate through the point of contact of the grain with said substrate.

In the case of these rays, the effect is the same as if they had been produced by a light source in intimate optical contact with the substrate. When the angle of incidence $\theta$ of these rays on the internal exit face of the substrate is smaller than the angle $\theta_o$ so that $\sin\theta_o = 1/n$, where n is the refractive index of the substrate, these rays pass through the substrate towards the observer. This is the case of the rays $B_1$ and $B_2$ of FIG. 4. On the other hand, when the angle of incidence is larger than or equal to $\theta_o$, a total reflection phenomenon takes place and the light rays such as the ray $B_3$ in FIG. 4 are returned to the internal entrance face of the substrate. These rays are reflected laterally to a grain C which is in contact with the substrate and located at a distance: $D = 2e\cdot tg\theta_o \simeq 2e$ from the grain B by reason of the fact that, with a glass substrate, $n = 1.5$ and $\theta_o = 42°$. As a result of diffraction or diffusion, the rays which impinge on the grain C are in some cases such as the ray $C_1$ re-emitted towards the observer whilst other rays such as the ray $C_2$ are reflected back to another grain D located at a distance approximately equal to $2e$ from the grain C.

This phenomenon continues from point to point until exhaustion of the light intensity and in all directions about the point B. A large number of rings thus appear around a light spot centered at B. These rings are relatively spaced at a distance D and have decreasing values of light intensity I, $I_1$, $I_2$, $I_3$. The other points such as C or D exhibit halo phenomena which are less luminous than the halos oentered at the point B.

In FIG. 5, the substrate is shown in cross-section as well as the path of the light rays and in particular the rays which undergo total reflection. The variations in intensity I which are observed and correspond to the central spot and to the different halos are also shown in FIG. 5.

A number of known techniques which seek to suppress this halo phenomenon will hereinafter be described with reference to FIGS. 6 to 10. This phenomenon is highly objectionable since it gives rise to parasitic information which interferes with the useful information. Furthermore, the phenomenon produces a reduction in contrast of the screen.

The problem which arises is that the known techniques do not prove satisfactory. In particular, these techniques improve the contrast but produce a drop in luminous efficiency. Some of these techniques have the effect of reducing the resolution.

The present invention makes it possible to solve this problem and, as will hereinafter be explained in detail, makes it possible to obtain a screen which provides optimized contrast without excessive reduction of gain and without any impairment of resolution.

SUMMARY OF THE INVENTION

The present invention as defined in claim 1 relates to a luminescent screen constituted in particular by a plurality of layers of luminescent material in the form of grains deposited on a transparent substrate. The distinctive feature of the screen lies in the fact that blocks are placed between the grains of the first layer of material and the substrate. The cross-sectional area of the blocks is equal at a maximum to the cross-sectional area of the grains and the optical transparency of said blocks is smaller than 1.

The present invention as defined in claim 13 further relates to a method of fabrication of a luminescent screen and comprises the following steps:

(a) a thin film-layer having the desired optical transparency is deposited on the transparent substrate;

(b) a first layer of grains of luminescent material is deposited on said film-layer;

(c) a selective plasma etching operation is performed on the thin film-layer by making use of the grains of the first layer as a mask in order to obtain the blocks;

(d) the other layers of luminescent grains are deposited and the screen is then completed in the usual manner.

BRIEF DESCRIPTION OF THE DRAWINGS

Other features of the invention will be more apparent upon consideration of the following description and accompanying drawings, wherein:

FIGS. 6 to 10 are diagrams illustrating the known techniques for suppressing the halo phenomenon;

In the different figures, the same references designate the same elements. For reasons of enhanced clarity, a number of different elements have not been drawn to scale.

DESCRIPTION OF THE PRIOR ART

(FIGS. 6 to 10)

The solutions adopted in the prior art as corrective measures against the halo phenomenon will be briefly recalled with reference to FIGS. 6 to 10.

A first solution consists in employing a substrate of glass which is tinted right through and the optical transparency $T_1$ of which is less than 1.

Figure 1:
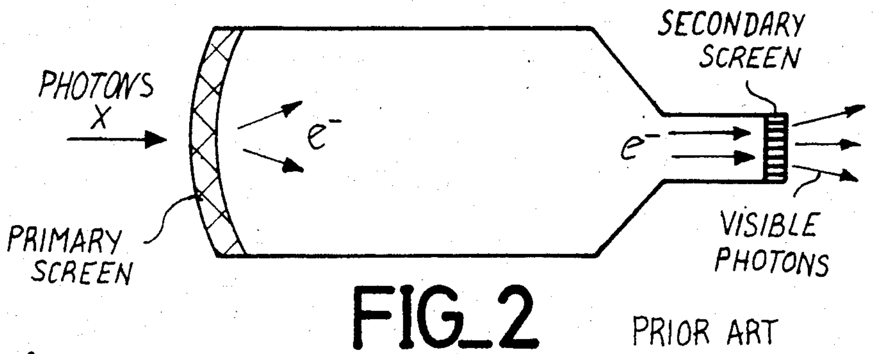
PRIOR ART FIG 1
FIG. 1 is a diagram of an x-ray image intensifier.
Figure 2:
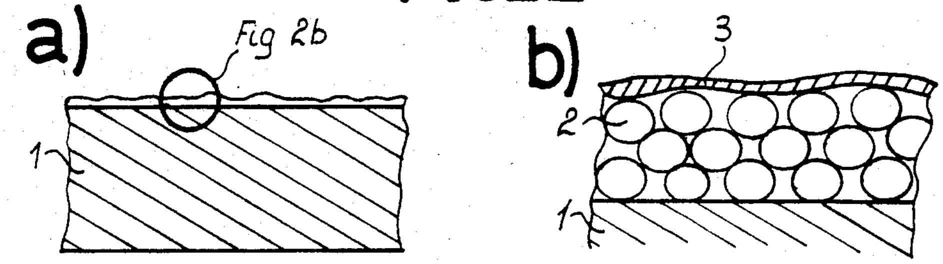
FIG 2 PRIOR ART
FIGS. 2*a* and 2*b* are sectional views of a luminescent screen.
Figure 3:
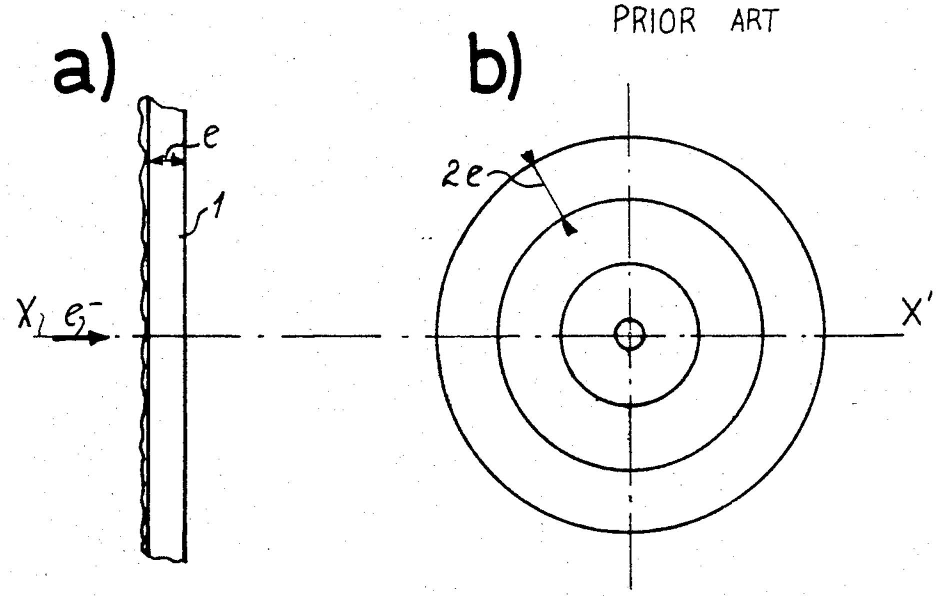
FIG 3 PRIOR ART
FIGS. 3*a* and 3*b* and FIGS. 4 and 5 are diagrams illustrating the halo phenomenon observed in luminescent screens.
Figure 4:
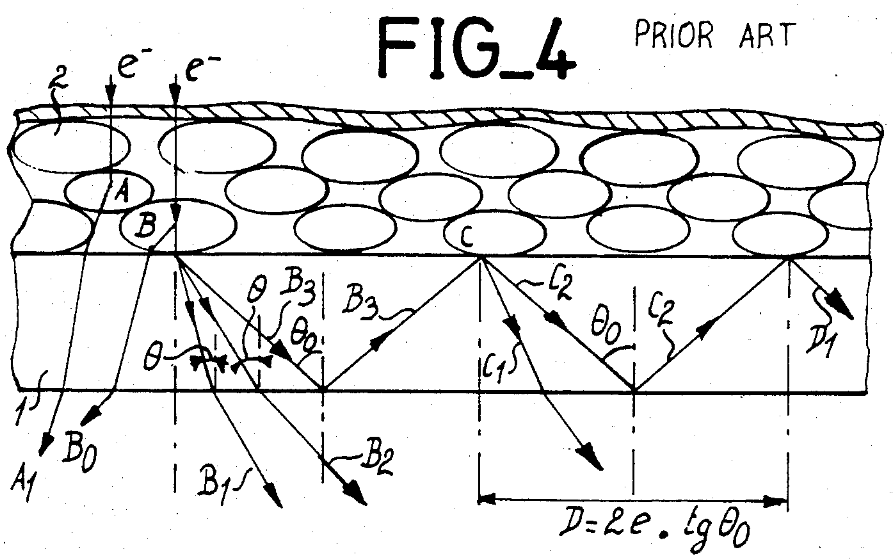
FIG 4 PRIOR ART
Figure 5:
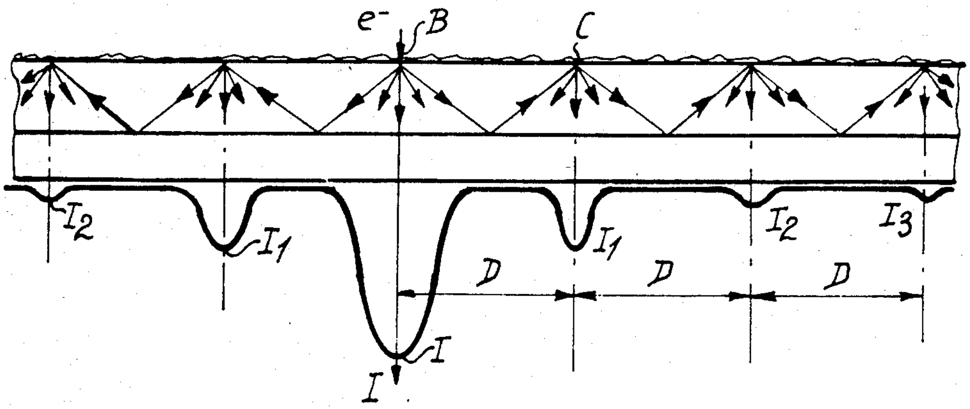
FIG 5 PRIOR ART
Figure 6:
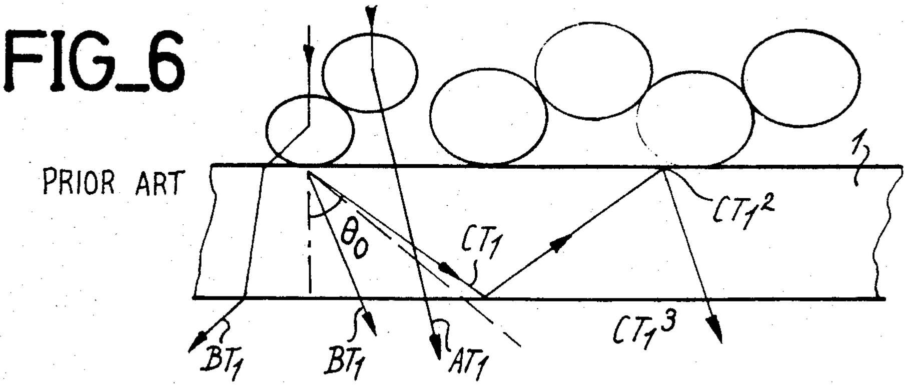
FIG 6 PRIOR ART

A screen of this type is shown in cross-section in FIG. 6. The rays of intensity $AT_1$ and $BT_1$ do not take part in the formation of halos as is the case with the ray of intensity $CT_1^3$ which undergoes total reflection.

The gain G (or luminous efficiency) of this screen is expressed as a function of the gain $G_o$ of a screen comprising a transparent glass substrate by the relation $G_1=G_o \cdot T_1$. It is recalled that the gain is the ratio between the light power emitted by the screen and the electric power received by this latter.

The contrast $C_1$ of said screen is expressed as a function of the contrast $C_o$ of a screen having a transparent glass substrate by the relation: $C_1=C_o \cdot (1/T_1^2)$. It is recalled that the contrast is the ratio of luminances of an excited screen zone and of an unexcited screen zone.

This solution therefore makes it possible to increase the contrast but on the other hand has the effect of reducing the gain. A compromise must be made in the choice of the transparency $T_1$ in order to ensure compliance with the minimum gain which users are prepared to accept.

A second solution consists in driving the halos outside the useful zone of the screen by increasing the screen thickness e. As will readily be apparent, if $\theta$ designates the diameter of the useful zone delimited by a mask 4 in FIG. 7, it may accordingly be ensured that all the halos are located outside this zone simply by verifying the following relation: $2e >> \phi$.

The increase in thickness e of the substrate is limited on practical grounds. An excessive increase in this thickness would modify the available optical path from the exit of the x-ray image intensifier to the utilization of the image.

The other two solutions which will now be described involve the use of an intermediate layer 5 between the substrate 1 and the first layer of luminescent material.

FIG. 8 illustrates the solution in which this intermediate layer is a metallic layer having a transparency $T_2$. The gain $G_2$ and the contrast $C_2$ are expressed by the same type of relations as those which govern the use of a substrate of tinted glass:

$$G_2=G_O \cdot T_2$$

$$C_2=C_O \cdot (1/T_2^2).$$

It is therefore apparent that the same disadvantages as in the case of a substrate of tinted glass are again present, namely an increase in contrast accompanied by a reduction in gain.

A further drawback of the intermediate layer is that, for example in the case of the ray of intensity A in FIG. 8, there is a transmission of a ray of intensity $AT_2$ towards the observer and a reflection of a ray of intensity $A \cdot (1-T_2)$ from the metallic layer. This reflected ray is finally transmitted to the observer but contributes to a reduction in resolving power of the screen since it has the effect of increasing the diameter of the central spot corresponding to impact of the electron beam.

The other known solution makes use of an intermediate layer 5 which was described in European patent Application No. 0.018.666. This intermediate layer can be formed by alternate layers of silicon oxide and titanium oxide. FIG. 9 shows the coefficient of reflection R of said layer as a function of the angle of incidence $\theta$. When the angle of incidence is smaller than the angle of total reflection $\theta o$, the coefficient of reflection is substantially zero. This coefficient of reflection becomes substantially equal to 1 in respect of an angle of incidence which is larger than $\theta_o$.

In consequence, this intermediate layer has practically total transparency T (with $T=1-R$) in respect of rays such as the ray A of FIG. 10, the angle of incidence of which is smaller than $\theta_o$. On the other hand, this layer prevents any emergence towards the observer of rays which contribute to the formation of halos. In FIG. 10, it is seen that the ray B whose angle of incidence is equal to $\theta_o$ propagates laterally within the substrate without emerging from this latter towards the observer. This ray B undergoes successive total reflections from both faces of the substrate.

Said intermediate layer has a disadvantage in that it produces a decrease in resolution as a result of a phenomenon which is the same as the one explained earlier in the case of the metallic layer. Furthermore, the formation of this layer is difficult as well as costly.

DESCRIPTION OF THE PREFERRED EMBODIMENTS

Figure 11:
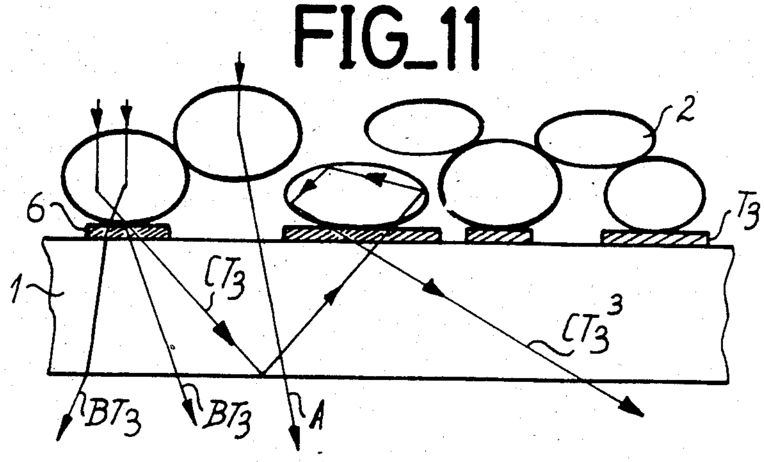
FIG. 11 is a sectional view of one embodiment of the screen in accordance with the invention.

The sectional view of FIG. 11 shows one embodiment of a screen in accordance with the invention. Blocks 6 are located between the grains of the first layer of luminescent material and the transparent support or substrate 1. These blocks have a cross-sectional area which is equal at a maximum to the cross-sectional area of the grains and have an optical transparency $T_3$ of less than 1.

It is apparent from FIG. 11 that the light rays generated within a grain which is not in contact with the substrate pass through the emergent face of this latter to the observer without attenuation, which is the case of the ray A.

The light rays which are generated within the grains of the first layer but emerge from these grains at a location other than the point of contact of the grain with the substrate may have to pass through a block 6 as shown in FIG. 11. A ray of intensity $BT_3$, for example, is accordingly obtained in this case. There is an equally conceivable likelihood, however, that these rays may not pass through any block.

Consideration will now be given to the case in which light rays are emitted by a grain which is in contact with the substrate and also enter the substrate at the point of contact of the grain with said substrate.

A certain number of these rays do not undergo total reflection and emerge for example with an intensity $BT_3$. Others undergo total reflection as is the case with the ray of intensity $CT_3$, for example. A ray of this type may emerge from the substrate with an intensity $CT_3^3$ after being reflected from another grain and after having effected a double traversal through the block which supports this grain.

In comparison with FIG. 6 which relates to the use of a substrate of tinted glass, it is observed that the rays generated within grains other than those of the first layer are not attenuated.

This permits the achievement of enhanced gain and contrast in comparison with the known solutions.

The gain and contrast of the screen in accordance with the invention are designated by the references $G_3$ and $C_3$.

Postulating that the transparency $T_3$ of the blocks and the transparency $T_1$ of the tinted glass substrate 1 are the same, it is shown by calculation that the following relations are obtained:

$$C_3>C_1>C_o \text{ and } G_o>G_3>G_1$$

The above relations show that the invention makes it possible to obtain in respect of $T_3=T_1$ a contrast $C_3$ which is higher than the contrast $C_1$ obtained by means of a substrate of tinted glass and higher than the contrast $C_o$ obtained without any of the special arrangements of grains and blocks contemplated in the foregoing. The invention makes it possible at the same time to achieve a gain $G_3$ which is higher than the gain obtained with a tinted glass $G_1$ but lower than the gain $G_o$ obtained without any special arrangement.

Assuming that a minimum gain is maintained, it is also demonstrated by calculation that lower transparency is permitted in the case of a screen in accordance with the invention and in the case of a screen having a substrate of tinted glass. Since the blocks in accordance with the invention permit higher contrast when the transparency is the same, it is clear that the invention makes it possible to achieve even greater enhancement of contrast by maintaining a minimum gain.

A further advantage of the invention lies in the fact that the presence of blocks does not reduce the resolution whereas this is the case when an intermediate layer is provided between the glass substrate and the first layer of grains.

There will now be described a method of fabrication of a screen in accordance with the invention, reference being made to FIGS. 12*a*, 12*b*, 12*c*, and 12*d*.

Figure 12:
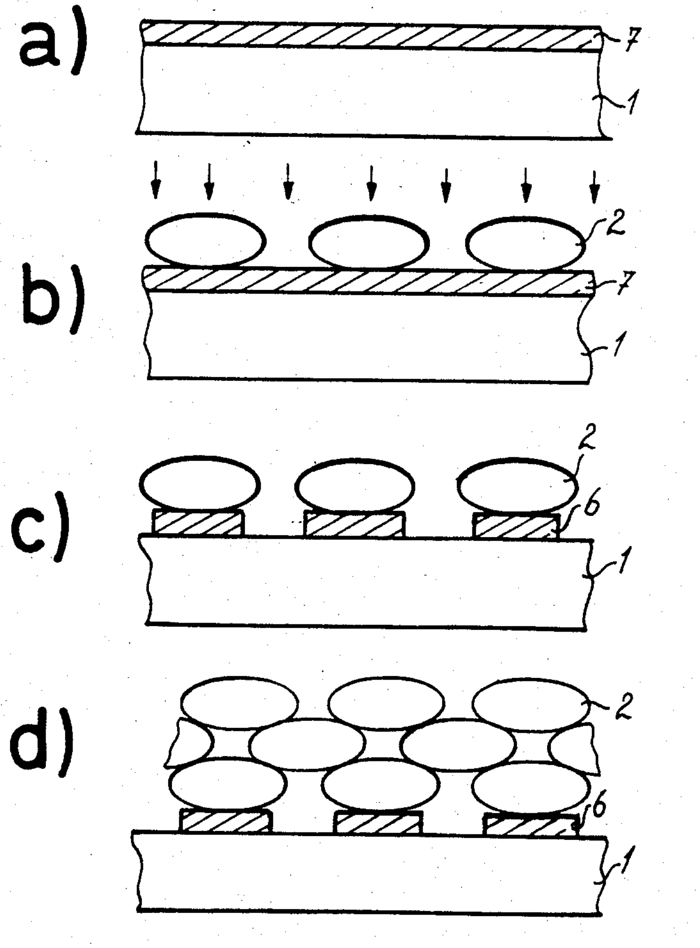
FIGS. 12*a* to 12*d* are diagrams illustrating the different steps of a method of fabrication of one embodiment of a screen in accordance with the invention.

As shown in FIG. 12*a*, a thin film-layer 7 of material having the desired transparency is deposited on the substrate 1. This deposit can be formed by vacuum evaporation or by electrochemical process, for example. This film-layer 7 can have a thickness of a few hundred angströms, for example.

The material employed can consist of any absorbent material such as metal or carbon, for example.

A first layer of grains of luminescent material is deposited on the film-layer 7. As shown in FIG. 12*b*, well-individualized grains are obtained by means of conventional techniques. A selective plasma attack or etching operation is carried out on the layer 7 by making use of the grains of the first layer as a mask. The plasma attack is indicated schematically by vertical arrows in FIG. 12*b*.

The etching operation is performed by means of argon ions, for example, in the case of a layer 7 of silver or gold.

By way of example, a carbon layer can be formed by evaporation by making use of a plasma which comprises a hydrocarbon gas or by depositing a single layer of carbon particles having a diameter of less than 0.1 micron, for example, whereas the grains of luminescent material have a much larger diameter in the vicinity of ten microns, for example. In the case of a carbon layer 7, the etching operation is performed by mcans of oxygen plasma.

FIG. 12*c* shows the result of the above-mentioned etching operation. This operation must be stopped at the surface of the substrate in order to avoid any surface roughening which would have the effect of impairing the resolution of the screen.

Additional layers of grains of luminescent material are then deposited on the first layer and the screen is completed in the usual manner as shown in FIG. 12*d.*

Figure 13:
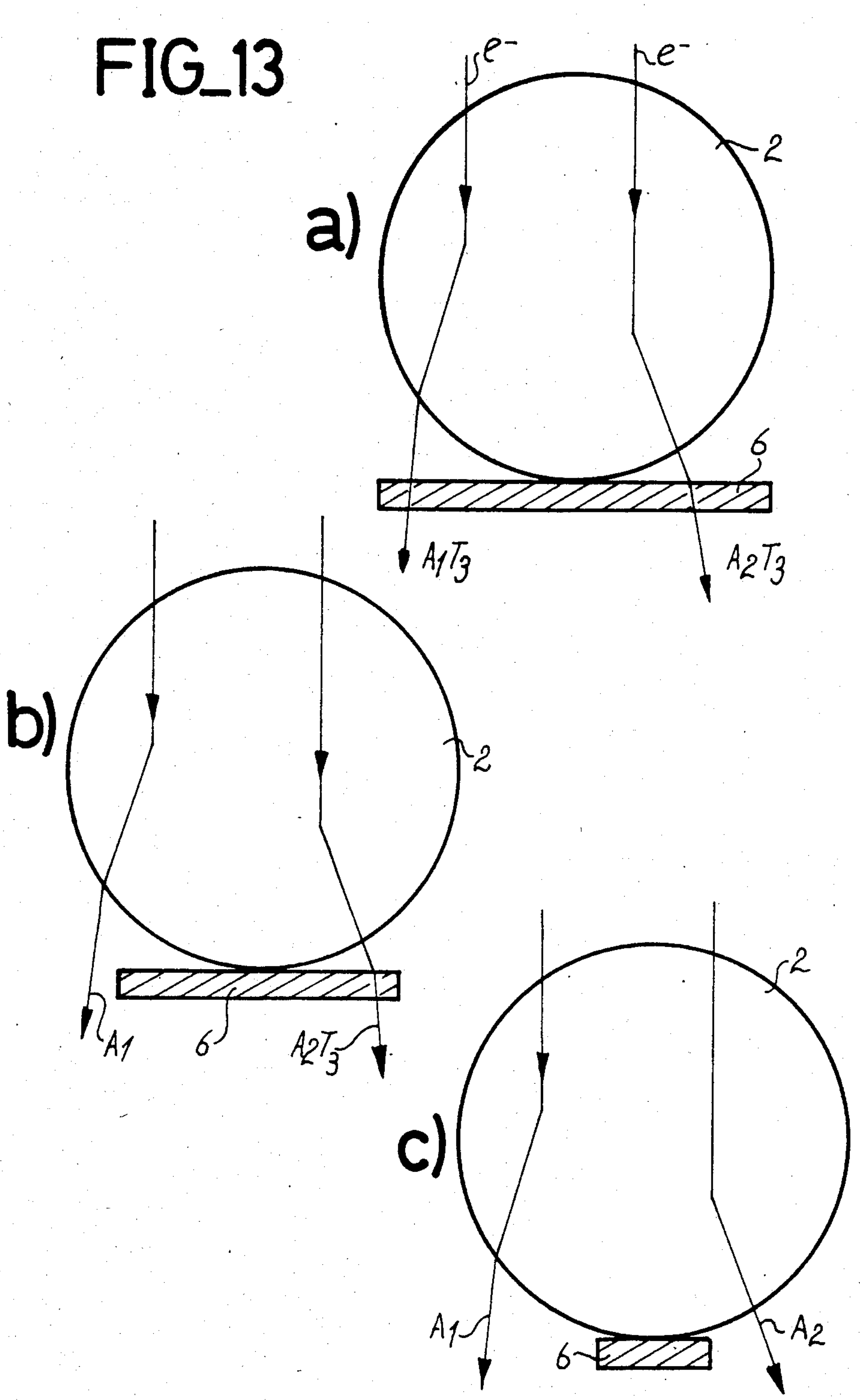
FIGS. 13*a*, 13*b*, 13*c* are diagrams showing the block associated with each grain of the first layer.

FIGS. 13*a,* 13*b,* 13*c* show a grain of luminescent material 2 and its block 6. In FIG. 13*a,* the block has a cross-sectional area which is substantially equal to that of the grain. In FIGS. 13*b* and 13*c,* the block has a substantially decreasing cross-sectional area which is smaller than that of the grain. It is clear that, as the cross-sectional area of the block is increasingly limited to the point of contact between the grain and the block, so the efficiency and contrast are improved. Thus the intensity attenuation produced by the block is limited to the rays generated at the point of contact between grain and block.

The method of fabrication herein described makes it possible to obtain blocks having a cross-sectional area which is equal at a maximum to the cross-sectional area of the grains. In order to obtain configurations such as that of FIG. 13*c,* the directionality of attack of the plasma jet can be modified. The directionality of the plasma jet is modified in order to reduce the cross-sectional area of the blocks.

The material employed for fabricating the blocks must exhibit good adhesion to the glass of the substrate. This material must also be strongly etched by plasma whereas the luminescent material of the grains and the glass are lightly etched. As has already been noted, it is possible to employ a metal such as silver or gold, for example, or carbon. It is also possible to employ a layer of the type mentioned earlier and described in European patent Application No. 0.018.666. The gain and efficiency are thus increased without reducing the resolution of the screen. For the selective etching operation, it is necessary in this case to employ a plasma which attacks said layer in a highly preferential manner whereas the luminescent material of the grains and the substrate are attacked only to a slight extent.

While making use of blocks between the glass substrate and the grains of the first layer, it is possible at the same time to increase the thickness e of the substrate. This thickness e must remain smaller than the radius of the useful zone. Should this not be the case, there would no longer be any halos but other problems would arise from an excessive thickness.

What is claimed is:

1. Luminescent screen comprising a transparent substrate (1); several layers of grains of luminescent material (2) adjacent one surface of said substrate; a discontinuous layer of blocks (6) between said substrate and a first layer of said luminescent grains, each of said blocks and a respective adjacent grain of said first layer having a cross-sectional area in a plane parallel to said substrate, with the cross-sectional area of the blocks being less than or equal to the largest cross-sectional area of said respective adjacent grains; and said blocks having an optical transparency smaller than one.

2. A screen according to claim 1, wherein the blocks are of metal or of carbon.

3. A screen according to claim 1 wherein the blocks are constituted by alternate layers of silicon oxide and titanium oxide.

4. A screen according to claim 1, wherein said screen is constituted by several layers of a cathodoluminescent material.

5. A screen according to claim 1, wherien the transparent substrate is of glass.

6. A screen according to claim 2, wherein said screen is constituted by a plurality of layers of cathodoluminescent material.

7. A screen according to claim 3, wherein said screen is constituted by a plurality of layers of cathodoluminescent material.

8. A screen according to claim 2, wherein the transparent substrate is of glass.

9. A screen according to claim 3, wherein the transparent substrate is of glass.

10. A screen according to claim 4, wherein the transparent substrate is of glass.

11. A screen according to claim 6, wherein the transparent substrate is of glass.

12. A screen according to claim 7, wherein the transparent substrate is of glass.

13. A method of fabrication of a luminescent screen comprising a transparent substrate, several layers of grains of luminescent material adjacent one surface of said substrate, a discontinuous layer of blocks between said substrate and a first layer of said luminescent grains, each of said blocks and a respective adjacent grain of said first layer having a cross-sectional area in a plane parallel to said substrate, with the cross-sectional area of the blocks being less than or equal to the largest cross-sectional area of said respective adjacent grains, and said blocks having an optical transparency smaller than one, wherein said method comprises the following steps:

(a) a thin film-layer having the desired optical transparency is deposited on the transparent substrate;
(b) a first layer of grains of luminescent material is deposited on said film-layer;
(c) a selective plasma etching operation is performed on the thin film-layer by masking use of the grains of the first layer as a mask in order to obtain blocks;
(d) the other layers of luminescent grains are deposited and the screen is completed in the usual manner.

14. A method according to claim 13, wherein the thin film-layer is of silver and wherein a selective etching operation is performed by means of argon ions.

15. A method according to claim 13, wherein the thin film-layer is of carbon and wherein a selective etching operation is performed by means of oxygen plasma.

16. A method according to claim 13, wherein the directionality of the plasma jet is modified in order to reduce the cross-sectional area of the blocks.

17. A method according to claim 14, wherein the directionality of the plasma jet is modified in order to reduce the cross-sectional area of the blocks.

18. A method according to claim 15, wherein the directionality of the plasma jet is modified in order to reduce the cross-seotional area of the blocks.

* * * * *